United States Patent [19]

Habiger

[11] 4,109,540

[45] Aug. 29, 1978

[54] OVERTRAVEL CONTROL MECHANISM FOR HYDROSTATIC TRANSMISSIONS

[75] Inventor: Cyril W. Habiger, Joliet, Ill.

[73] Assignee: Caterpillar Tractor Co., Peoria, Ill.

[21] Appl. No.: 809,727

[22] Filed: Jun. 24, 1977

[51] Int. Cl.[2] .......................... F16H 21/44; G05G 7/04

[52] U.S. Cl. .......................................... 74/96; 74/470; 74/516

[58] Field of Search .................. 74/10.9, 96, 470, 491, 74/516, 518

[56] References Cited

U.S. PATENT DOCUMENTS

| | | | |
|---|---|---|---|
| 2,231,609 | 2/1941 | Andersen | 74/10.9 X |
| 2,777,329 | 1/1957 | Banker | 74/96 |
| 3,055,226 | 9/1962 | Keissling | 74/470 X |
| 3,491,605 | 1/1970 | MacDonald | 74/96 |

*Primary Examiner*—Allan D. Herrmann

*Attorney, Agent, or Firm*—Phillips, Moore, Weissenberger, Lempio & Majestic

[57] ABSTRACT

An output shaft is rotatably mounted on a stationary support to selectively actuate a control valve of a hydrostatic transmission. A pair of levers are pivotally mounted on the output shaft in scissored relationship thereon and an actuating arm is rotatably mounted on the support to engage camming surfaces defined on first ends of the levers. A drive pin is secured to the output shaft to have opposite ends thereof engage bearing surfaces defined on second ends of the levers whereby swinging movements of the actuating arm in opposite directions will alternately transmit pivotal movements of the levers to the output shaft to control actuation of the control valve. The second ends of the levers are biased away from each other by a coil spring to normally engage the bearing surfaces with the drive pin.

12 Claims, 5 Drawing Figures

OVERTRAVEL CONTROL MECHANISM FOR HYDROSTATIC TRANSMISSIONS

BACKGROUND OF THE INVENTION

Rotary control shafts are utilized in control mechanisms for hydrostatic transmissions to selectively actuate the same. Various single-pedal actuated linkage systems have been proposed for use in such control mechanisms to effect selective rocking of the control shaft. Conventional linkage systems of this type are oftentimes unduly complex and place high stress concentrations on component parts thereof. In addition, relatively high initial starting torques are required to displace the control mechanisms from their neutral conditions of operation.

A single pedal is normally used to simultaneously actuate a throttle control lever for varying engine speed. The pedal force required to further increase engine speed, once the transmission has been placed in a full-speed forward or reverse condition of operation, is normally relatively high in conventional systems.

SUMMARY OF THIS INVENTION

The present invention is directed to overcome one or more of the problems as set forth above.

The control mechanism of this invention comprises rotatable input and output means and a pair of levers pivotally mounted relative to the output means. The rotary input means is engageable with the levers to alternately pivot them in response to rotation thereof. The drive means is connected to the output means and is engageable with second ends of the levers to selectively rotate the output means in response to rotation of the input means. A spring means is interconnected between the second ends of the levers to normally urge the first ends thereof into engagement with the input means.

BRIEF DESCRIPTION OF THE DRAWINGS

Other objects of this invention will become apparent from the following description and accompanying drawings wherein.

DETAILED DESCRIPTION

Figure 1:
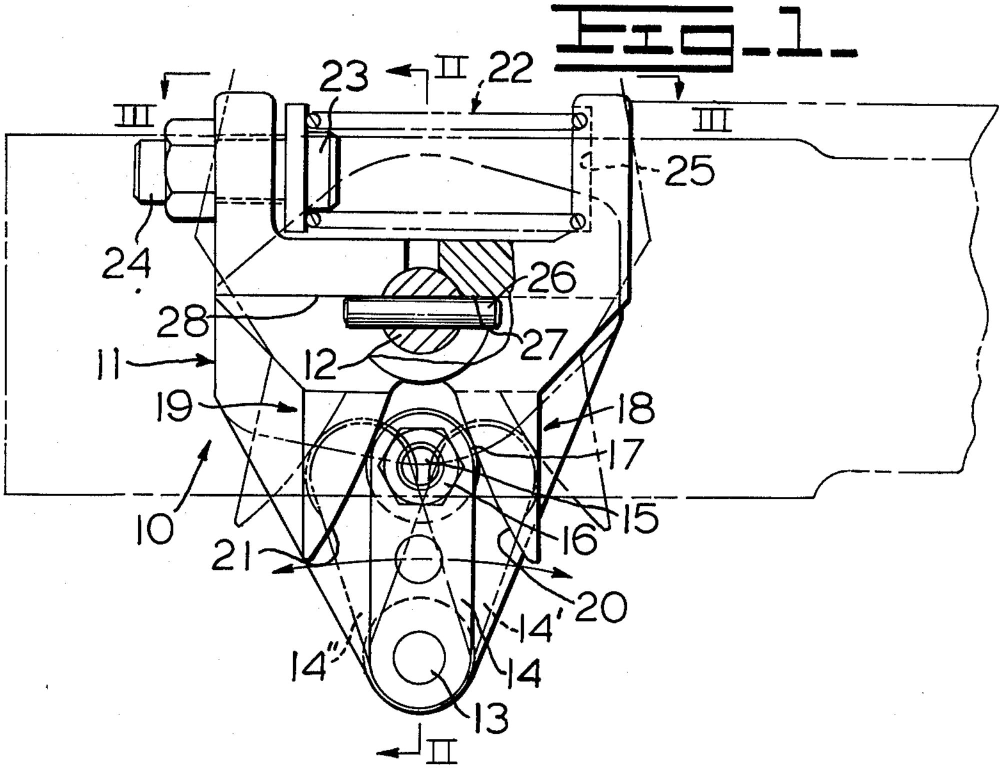
FIG. 1 is a front elevational view of the control mechanism of this invention for selectively rocking an output shaft, adapted to be operatively connected to a control valve of a hydrostatic transmission.
Figure 2:
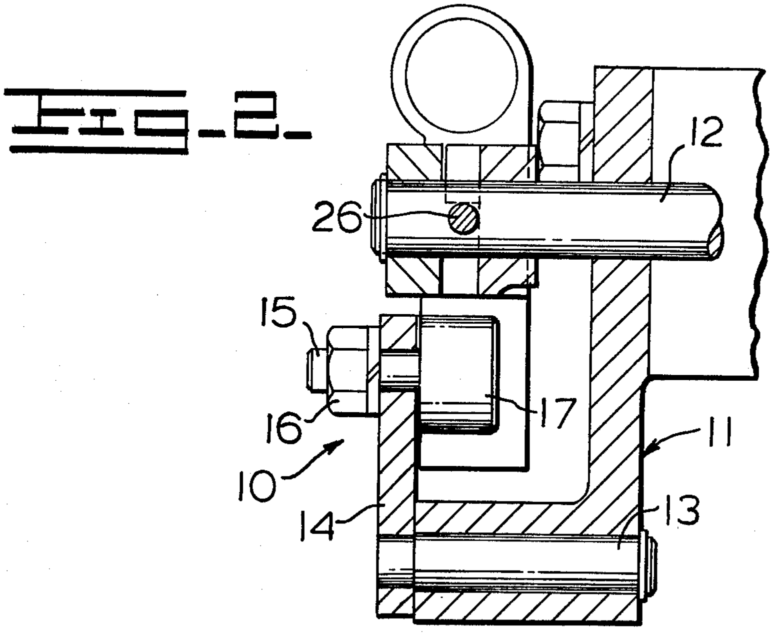
FIG. 2 is a sectional view through the control mechanism, taken in the direction of arrows II—II in FIG. 1.
Figure 3:
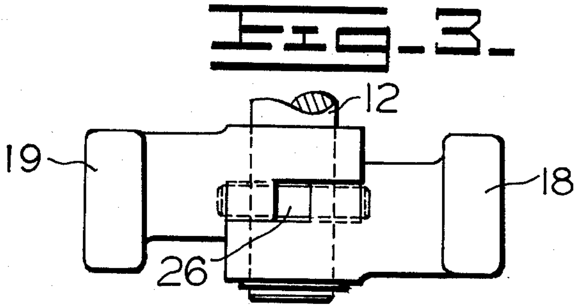
FIG. 3 is a view taken in the direction of arrows III—III in FIG. 1, but with a set screw and spring removed for the sake of clarity.
Figure 4:
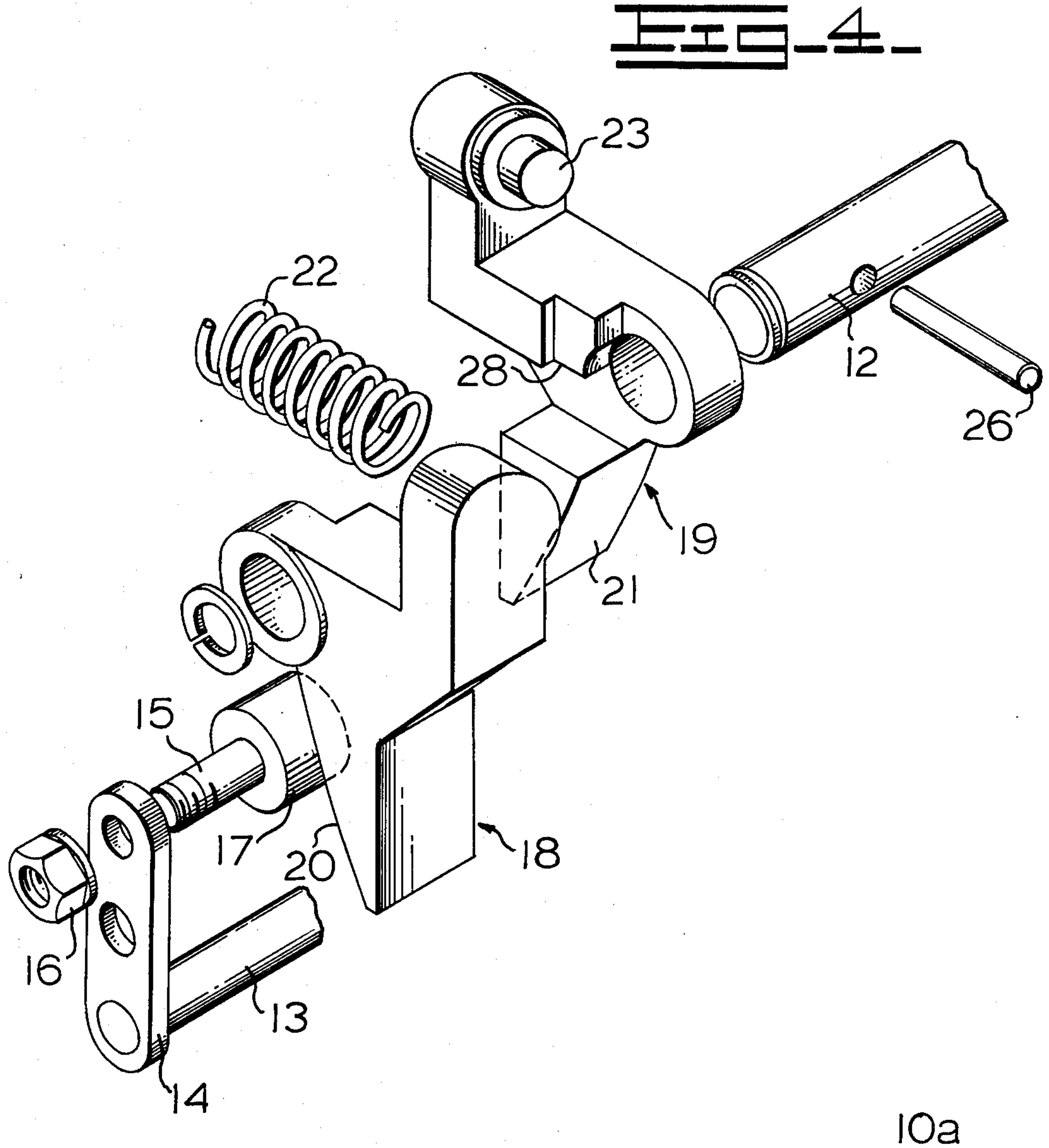
FIG. 4 is an isometric exploded view of the control mechanism.

FIGS. 1–4 illustrate a control mechanism 10 mounted on a stationary support or bracket 11. The mechanism may be suitably enclosed and sealed within a housing (not shown) to protect the mechanism against ambient conditions and to also retain lubricating oil therein. A rock shaft or output means 12 is rotatably mounted on the support and is adapted to be connected to a rotary control valve (not shown) of a hydrostatic transmission in a conventional manner. It should be understood that the control mechanism of this invention could be utilized in other applications wherein it is desirable to closely control the rotary movements of a control shaft.

Rocking movements are selectively imparted to rock shaft 12 by input means comprising a shaft 13 having a first end of an actuating arm 14 secured thereon. The actuating arm is adapted for connection to a pedal-actuated linkage (not shown), the foot pedal of which is suitably mounted in an operator's cab of a vehicle. Such pedal-actuated linkage may be of the type disclosed in U.S. Patent Application Ser. No. 809,726, filed on June 24, 1977, by Richard N. Fatur for "Transmission and Throttle Control Arrangement".

As shown in FIG. 1, actuating arm 14 is thus adapted for swinging movements between the illustrated phantom line positions 14' and 14" which depict full speed forward and reverse conditions of transmission operation, respectively. A pin 15 is secured to a second end of the actuating arm by a nut 16 and has a cylindrical roller 17 rotatably mounted thereon. A pair of substantially identical lever means or levers 18 and 19 are pivotally mounted for relative movements on output shaft 12 and are disposed in scissored relationship relative to each other, as clearly shown in FIG. 1.

Arcuate camming surfaces 20 and 21 are formed on levers 18 and 19, respectively, to normally engage roller 17. Thus, swinging movements of the actuating arm about the longitudinal axis of input shaft 13, between phantom line positions 14' and 14" illustrated in FIG. 1, will alternately pivot the levers on the output shaft. As will be hereinafter more fully described, the camming surfaces are disposed relative to the rotational axis of input shaft 13 to initially pivot a respective one of the levers relative to the output shaft and for thereafter permitting the input shaft to rotate relative to such lever without pivoting the lever relative to the output shaft by any appreciable amount.

Second ends of levers 18 and 19 have a compression coil spring 22 mounted therebetween for normally urging the first ends of the levers into engagement with roller 17 of the input means. As more clearly shown in FIG. 1, one end of the spring is mounted on an adjustable boss 23, secured to an end of a set screw 24, whereas a second end of the spring is disposed in an annular recess 25 formed in lever 18. The set screw thus comprises adjustment means for selectively setting the compressive force on the spring which will, in turn, responsively set the magnitude of bearing contact between roller 17 and levers 18 and 19. A drive means in the form of a horizontally disposed pin 26 is secured to output shaft 12 to have opposite ends thereof normally engage bearing surfaces 27 and 28 formed on levers 18 and 19, respectively.

Figure 5:
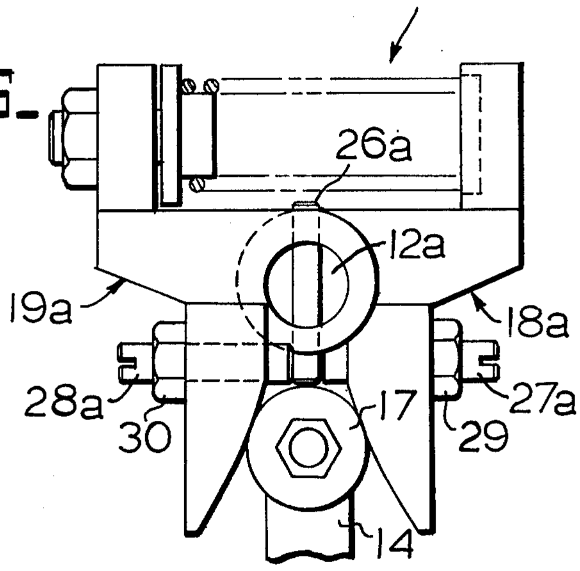
FIG. 5 illustrates a modification of the control mechanism.

FIG. 5 illustrates a modified control mechanism **10*a* wherein corresponding constructions are depicted by identical numerals, but with numerals appearing in FIG. 5** being accompanied by an "*a*". The modified control mechanism comprises a pair of levers **18*a* and 19*a* pivotally mounted for relative movements on an output shaft 12*a*. A vertically disposed drive pin 26*a* is secured to the output shaft and has an end thereof normally disposed between and engaging bearing surfaces formed on the ends of a pair of set screws 27*a* and 28*a***.

Set screws **27*a* and 28*a* are threadably mounted on levers 18*a* and 19*a*, respectively. Lock nuts 29 and 30 are adapted to lock the respective set screws in their selected adjusted position to precisely position bearing surfaces formed on the ends of the set screws in bearing contact on either side of pin 26*a***.

FIG. 1 illustrates the control mechanism in a neutral condition of operation whereby the pump of the hydrostatic transmission will be maintained at zero displacement. When the operator of the vehicle depresses a pedal in the opertor's cab to rotate input shaft 13 clockwise to swing actuating arm 14 to its phantom line position 14', the transmission will be placed in its full-speed forward condition of operation. Clockwise rotation of the input shaft will rotate output shaft 12 counterclockwise in response to counterclockwise rotation of lever 18 which causes leftward compression of spring 22 to rotate lever 19 counterclockwise against pin 26. Simultaneously therewith, a throttle control lever (not shown) will be actuated to increase engine speed to 1,500 r.p.m., for example. Further depression of th pedal to increase engine speed to 2,600 r.p.m., for example, will also swing actuating arm 14 in a clockwise direction about the rotational axis of input shaft 13 in FIG. 1.

Such additional movement of the actuating arm will essentially constitute "lost-motion" whereby an overtravel condition of the control mechanism is achieved to prevent any appreciable rocking of output shaft 12. A similar sequence of operation will occur when the operator's control pedal is depressed in a reverse manner to swing actuating arm 14 in a counterclockwise direction to its 14' position in FIG. 1 whereby the transmission is placed in its full-speed reverse condition of operation. The FIG. 5 modified control mechanism will function in a like manner.

The embodiments of the invention in which an exclusive property or privilege is claimed are defined as follows:

1. A control mechanism comprising
   rotary output means,
   a pair of first and second lever means pivotally mounted for movement relative to said output means,
   rotary input means engageable with a first end of each of said first and second lever means for alternately pivoting said first and second lever means in response to rotation of said input means in opposite directions,
   drive means connected to said output means and engageable with second ends of said first and second lever means, and
   spring means connected between the second ends of said first and second lever means for normally urging the first ends thereof into engagement with said input means.

2. The control mechanism of claim 1 wherein said input means comprises an input shaft rotatably mounted on said support and an actuating arm secured to said input shaft and normally engaged between the first ends of said first and second lever means when said control mechanism is in its neutral condition of operation.

3. The control mechanism of claim 2 further comprising an arcuate camming surface means formed on the first end of each of said first and second lever means and normally engaging said actuating arm.

4. The control mechanism of claim 3 wherein each said camming surface means is disposed relative to a rotational axis of said input shaft for initially pivoting a respective one of said first and second lever means relative to said output means and for thereafter permitting said input shaft to move relative to such lever means without pivoting such lever means relative to said output means.

5. The control mechanism of claim 3 wherein said actuating arm has a roller rotatably mounted thereon and normally engaged between the camming surface means formed on said first and second lever means.

6. The control mechanism of claim 1 wherein said spring means constitutes a compression coil spring.

7. The control mechanism of claim 6 further comprising adjustment means for selectively setting the compressive force on said spring and for responsively setting the magnitude of bearing contact between said input means and said first and second lever means.

8. The control mechanism of claim 1 wherein said output means constitutes an output shaft and wherein said drive means constitutes a pin secured to said output shaft.

9. The control mechanism of claim 8 wherein opposite ends of said pin each normally engages a bearing surface formed on a second end of a respective one of said first and second lever means.

10. The control mechanism of claim 8 further comprising adjustment means for selectively adjusting the disposition of a bearing surface on each of said first and second lever means relative to said pin.

11. The control mechanism of claim 10 wherein the bearing surfaces of said first and second lever means are disposed on either side of an end of said pin.

12. The control mechanism of claim 10 wherein said adjustment means comprises a set screw threadably mounted on a respective one of said first and second lever means and wherein said bearing surface is formed on an end of said set screw.

* * * * *